United States Patent [19]

Pilz

[11] Patent Number: 5,054,235
[45] Date of Patent: Oct. 8, 1991

[54] NURSERY PLANT CONTAINERS

[76] Inventor: David Pilz, P.O. Box 2238, Corvallis, Oreg. 97339

[21] Appl. No.: 571,715

[22] Filed: Aug. 24, 1990

[51] Int. Cl.$^5$ ............................................. A01G 23/02
[52] U.S. Cl. .......................................... 47/73; 47/77; 206/423
[58] Field of Search .................... 47/73, 77, 74, 78; 206/423

[56] References Cited

U.S. PATENT DOCUMENTS

| | | | |
|---|---|---|---|
| 1,936,988 | 11/1933 | Otwell | 47/77 |
| 3,785,088 | 1/1974 | Guarriello . | |
| 4,008,544 | 2/1977 | Rupprecht | 47/77 |
| 4,347,686 | 9/1982 | Wood | 47/73 |
| 4,753,037 | 6/1988 | Whitcomb . | |

FOREIGN PATENT DOCUMENTS

| | | | |
|---|---|---|---|
| 2306817 | 11/1976 | France | 206/423 |
| 2212376 | 7/1989 | United Kingdom | 47/73 |

Primary Examiner—Richard E. Chilcot, Jr.
Assistant Examiner—Joanne C. Downs
Attorney, Agent, or Firm—James D. Givnan, Jr.

[57] ABSTRACT

A pot for nursery plants having opposed walls joined along their edges with margins of the walls having a series of openings to promote air-pruning of the plant roots. The wall edges may be joined to one another by various means including fusing, adhesives, taping or the pot may be a molded structure. A rack is disclosed having receptacles of appropriate shape to receive a multitude of pots of similar external shape for pot support in a snug manner. A modified form of the pot includes three wall members each having a series of edge located openings. The walls are joined along their edges with each wall member having legs to provide a free-standing pot.

12 Claims, 2 Drawing Sheets

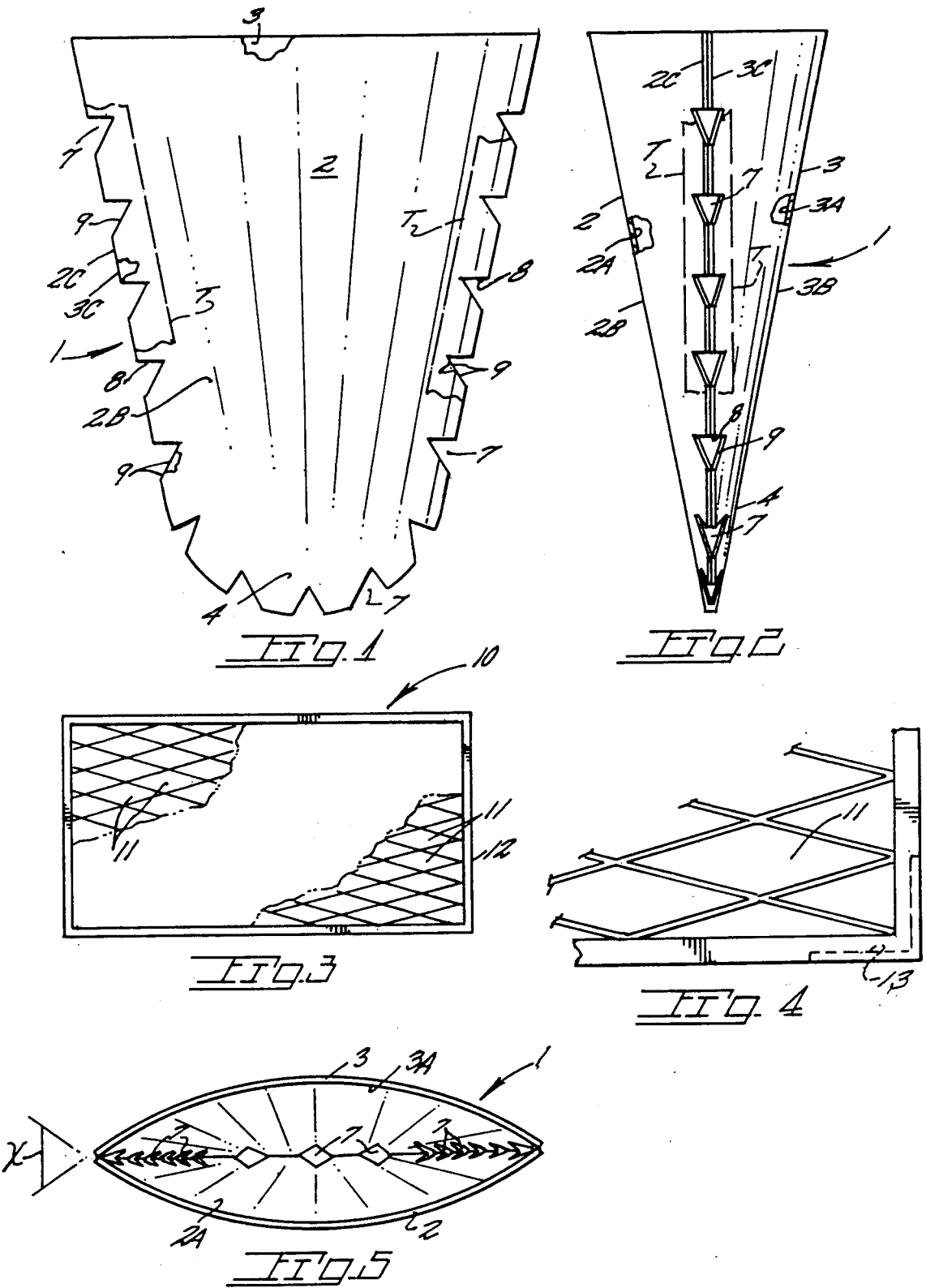

NURSERY PLANT CONTAINERS

BACKGROUND OF THE INVENTION

The present invention concerns generally plant containers used in nurseries and particularly to such container effecting air pruning of plant roots.

It is well recognized that the condition of the root system of a potted nursery plant determines the prospects of the plant surviving being transplanted successfully.

Conventional plant containers with solid walls or with only drain openings often cause the plant roots to be crowded in the bottom of the container or along upright container walls. As successful transplanting is largely contingent upon rapid root colonization of the native soil, such matting or crowding of the roots in a potted plant is highly undesirable. Such a root system does not have enough properly positioned small roots to provide adequate nutrients or moisture to the plant.

Attempts have been made to provide nursery plant containers with openings in the container walls for the purpose of promoting root growth as the openings permit air-pruning of the roots as, for example, the pot disclosed in U.S. Pat. No. 4,753,037. Associated with the openings in the prior art container are inclined ledges about the container for the purpose of guiding roots toward wall defined openings. Additionally, U.S. Pat. No. 3,785,088 discloses a nursery pot with an upright wall apertured so as to promote root growth as well as for drainage purposes. Further, openings are circumferentially spaced about the bottom of the container for root growth and to provide drainage.

The frequent pruning of root tips as by air-pruning will promote small root growth within the container. Upon transplating into native soil, new root tip initiation and elongation from these numerous rootlets will colonize the soil rapidly, providing nutrients and moisture, and quickly supporting top heavy plants. The following described container is directed toward overcoming the deficiencies of known nursery plant containers.

SUMMARY OF THE PRESENT INVENTION

The present invention is embodied within a nursery plant container having multiple walls in an acute relationship which define openings through which root tips may pass for purposes of air-pruning.

One form of the present container defines a multitude of openings along wall intersections through which root tips will grow and be pruned by air drying. Such pruning promotes the development of a fibrous root system having many root tips for rapid colonization of the soil into which a plant is outplanted. Positioning of the openings encourages development of roots pointed outward and downward rather than crowded in unnatural orientations along interior ledges or bottoms. New root growth into native soil will therefore continue in natural patterns providing better anchorage.

Development of numerous small root tips provides more opportunities for establishment of mycorrhizal symbioses. Further, the present pots provide greater interior surface areas relative potting soil volume than conventional pots to minimize the use of potting soil while increasing the area of contact between the plant root system and the native soil into which the plant is planted. A fibrous root system in a small volume of potting soil also holds the soil plug together during transplanting which minimizes root damage. A stand is provided to hold a multitude of the present pot in upright fashion without diminishing root exposure to the air. A modified form of nursery plant pot is formed with legs to space an open pot bottom from a supporting surface to permit air access.

Important objectives include the provision of nursery pots shaped to promote air-pruning of the plant for optimum root growth; the provision of nursery plant containers having a container volume less than conventional nursery pots to effect an economy in potting soil with openings in the present container assuring a hardy plant root system with beneficial transplating characteristics; the provision of a nursery plant pot and pot holder or rack of low cost construction for supporting a multitude of pots in a manner providing adequate exposure of the container to the air; the provision of a nursery pot having integral legs formed with side wall members with the side walls jointing defining an opening at the container bottom to allow air to act on the root tips.

BRIEF DESCRIPTION OF THE DRAWINGS

In the accompanying drawings:

FIG. 1 is a front elevational view of a nursery pot embodying the present invention;

FIG. 2 is a side elevational view of FIG. 1;

FIG. 3 is a plan view of a rack for supporting a number of the pots of the type shown in FIG. 1 and FIG. 2;

FIG. 4 is an enlarged fragmentary view of a corner of the rack shown in FIG. 3;

FIG. 5 is a top plan view of FIG. 1;

DETAILED DESCRIPTION OF THE PREFERRED EMBODIMENTS

Figure 6:
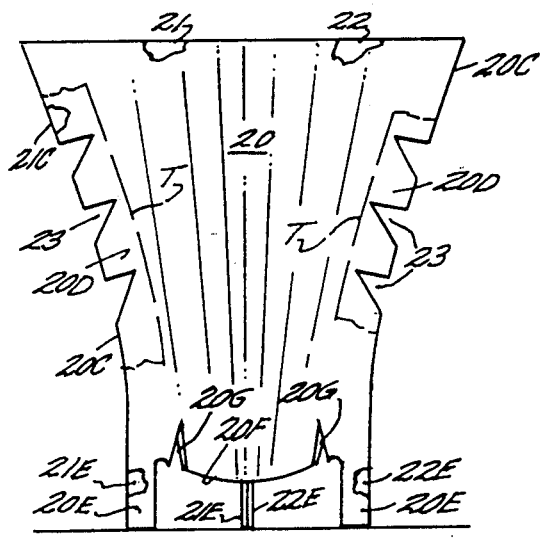
FIG. 6 is a front elevational view of a modified nursery pot.

With continuing attention to the drawings wherein applied reference numerals indicate parts similarly hereinafter identified, the reference numeral 1 indicates generally an embodiment of a nursery pot embodying the present invention.

Side walls at 2 and 3 are of inverted triangular shape modified to provide a lower inverted dome extremity 4. Each wall has a curved shape in horizontal section with a concave interior surface 2A-3A and a convex outer wall surface 2B-3B to define an acute included angle X at their intersection.

The edges at 2C-3C of each wall member are joined to one another with opposed surfaces joined to one another as by an adhesive, a fold or fusing of the marginal surfaces. A further means for joining the edges includes the application of tape strips at T to the exterior wall margins adjacent each edge 2C-3C with the tape having cut out areas or openings corresponding to wall cut out areas described below.

For purposes of air-pruning and the promotion of root growth, a series of openings or open areas 7 are formed in the wall margins along each wall edge 2C-3C. Exposure of root growth to air via the openings 7 results in air-pruning of the root to promote new root growth. A fibrous root system with many root tips is thus promoted to enable rapid colonization of native soil upon transplanting. The acute relationship of the walls guides the root tips into the openings 7. Toward this end the directly communicating openings 7 are each defined by inwardly converging generally horizontal edges 8 and inclined edges 9 each formed in a margin of walls 2 and 3. The openings additionally promote discharge of excess moisture from the potting soil.

As shown in FIGS. 3 and 4, a rack generally at 10 is provided having parallelogram shaped openings 11 into which the foregoing described may be deposited. The rack may be economically formed from molded plastic, and the generally parallelogram shaped openings 11 modified to match the exact contours and dimensions of the foregoing described containers. A frame is indicated at 12 to the corners of which are attached legs 13, both of which also may be formed of molded plastic. Rack, frame and legs may be bonded or fused.

Figure 7:
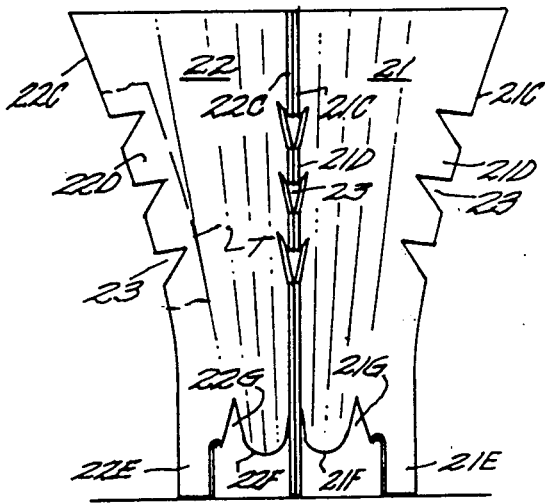
FIG. 7 is a rear elevational view of the pot shown in FIG. 6.
Figure 8:
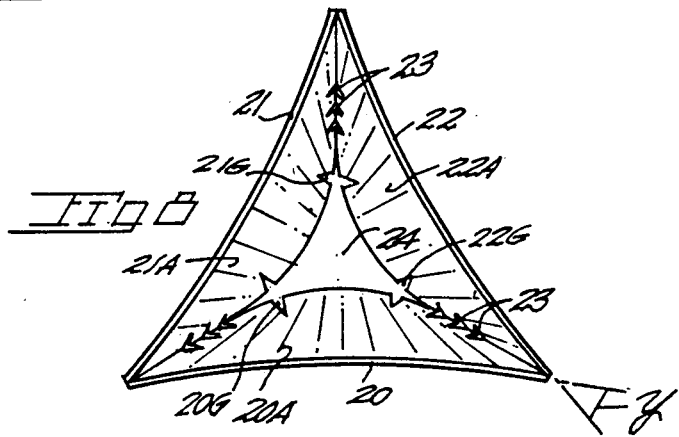
FIG. 8 is a top plan view of FIG. 6.
Figure 9:
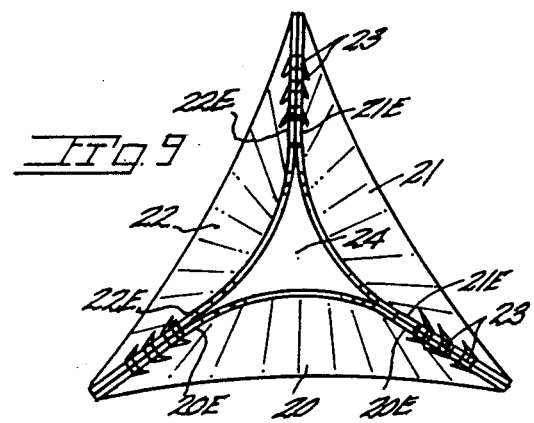
FIG. 9 is a bottom plan view of FIG. 7.

A modified pot in FIGS. 6-9 includes three walls 20, 21 and 22 also of curvilinear shape in horizontal section having inner surfaces 20A, 21A and 22A. Wall edges are at 20C, 21C and 22C with wall margins therealong each wall at 20D, 21D and 22D. The intersecting walls 20, 21 and 22 define acute included angles as at Y in horizontal section. As in the earlier described pot, wall edges may be joined to one another by the application of tape T or an adhesive or by fusing portions of abutting wall margins. Openings 23 in the pot are provided by the forming of notches in adjacent margins of the walls.

Legs at 20E, 21E and 22E are integral with their respective walls 20, 21 and 22 and serve to elevate bottom wall edges 20F, 21F and 22F from a surface. A bottom opening 24 is supplemented by the formation of bottom wall openings at 20G, 21G and 22G. The central bottom opening 24 is of a size and shape to retain pot contents by the pot contents bridging the opening.

The curved surfaces of the pot walls cause the root ends to be directed toward the wall intersections with subsequent downward travel of the root ends resulting in an exposure in openings 7 or 23 of the two versions of the present invention.

It will be understood that the present pot invention may be die cut from a blank of sheet material and folded to form the pot walls thereby reducing the effort required to form the contiguous wall configuration of the pot. Further, the pot may be of molded construction, if so desired. Downward convergence of the walls assures the nesting of stacked pots. A suitable material for the pots would be synthetic plastic sheet material of a flexible nature.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

1. A pot for nursery plants, said pot comprising,
   multiple intersecting walls each having upright edges proximate the upright edges of other of said walls and defining included acute angles, each of said walls having concave and formed convex surfaces and of flexible material,
   means joining the edges of said walls, and
   margins of said walls adjacent said edges jointly defining directly communicating open areas of fixed configuration permitting exposure of the roots of a plant in the pot to ambient air.

2. The pot claimed in claim 1 wherein said walls are a pair of opposed walls.

3. The pot claimed in claim 1 wherein said walls are in triangular relationship.

4. The pot claimed in claim 1 wherein said means is an adhesive applied to the wall margins.

5. The pot claimed in claim 1 wherein said means is tape strip applied to margins of the walls.

6. The pot claimed in claim 1 wherein said means are fused portions of said margins.

7. The pot claimed in claim 1 wherein said means is a fold.

8. The pot claimed in claim 1 wherein said walls are curved in horizontal section.

9. The pot claimed in claim 1 wherein each of said walls includes horizontal and inclined edges defining said directly communicating open areas.

10. The pot claimed in claim 1 additionally including legs integral with said walls.

11. The pot claimed in claim 10 wherein said legs are integral with the margins of said walls.

12. The pot claimed in claim 11 wherein said walls jointly define a bottom opening of the pot.

* * * * *